(12) United States Patent
de Haas

(10) Patent No.: US 11,368,330 B2
(45) Date of Patent: Jun. 21, 2022

(54) ERROR FRAME DETECTION

(71) Applicant: NXP B.V., Eindhoven (NL)

(72) Inventor: Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/916,413

(22) Filed: Jun. 30, 2020

(65) Prior Publication Data

US 2021/0006430 A1 Jan. 7, 2021

(30) Foreign Application Priority Data

Jul. 3, 2019 (EP) .................................... 19184275
Mar. 4, 2020 (EP) .................................... 20161026

(51) Int. Cl.
*H04L 12/40* (2006.01)

(52) U.S. Cl.
CPC .. *H04L 12/40013* (2013.01); *H04L 12/40169* (2013.01); *H04L 2012/40215* (2013.01); *H04L 2012/40273* (2013.01)

(58) Field of Classification Search
CPC ......... H04L 12/40013; H04L 12/40169; H04L 2012/40215; H04L 2012/40273
See application file for complete search history.

(56) References Cited

U.S. PATENT DOCUMENTS

| 8,094,688 B2 * | 1/2012 | Kishigami | ................ H04L 1/24 370/546 |
| 2004/0158781 A1 | 8/2004 | Pihet | |
| 2010/0201399 A1 * | 8/2010 | Metzner | ................ H04L 25/028 326/83 |
| 2010/0229046 A1 * | 9/2010 | Fuehrer | .................... G06F 9/546 714/43 |
| 2014/0365693 A1 | 12/2014 | Monroe et al. | |
| 2015/0089236 A1 * | 3/2015 | Han | ...................... H04W 12/10 713/181 |
| 2018/0041358 A1 * | 2/2018 | Kishigami | ............... H04B 1/40 |
| 2019/0385057 A1 * | 12/2019 | Litichever | ................ G06N 3/08 |

FOREIGN PATENT DOCUMENTS

| DE | 10 2017 223 417 A1 | 6/2019 |
| EP | 3 761 570 A1 | 1/2021 |

OTHER PUBLICATIONS

U.S. Appl. No. 16/916,369, filed Jun. 30, 2020, entitled: Collision Detection on a Can Bus.

* cited by examiner

*Primary Examiner* — Henry Tsai
*Assistant Examiner* — Harry Z Wang

(57) ABSTRACT

The disclosure relates to a transceiver and associated method and computer program. The transceiver comprises a transmitter for transmitting, based on an input signal, a transmitter output voltage to a differential signaling bus, the transceiver configured to: generate, from the input signal, a copy of the transmitter output voltage to provide an expected differential bus voltage; measure a differential bus voltage from the differential signaling bus; and detect an error frame on the differential signaling bus based on a comparison between the measured differential bus voltage and the expected differential bus voltage.

14 Claims, 13 Drawing Sheets

ERROR FRAME DETECTION

CROSS-REFERENCE TO RELATED APPLICATIONS

This application claims the priority under 35 U.S.C. § 119 of European patent application no. 20161026.8, filed on Mar. 4, 2020, and European patent application no. 19184275.6, filed on Jul. 3, 2019 the contents of which are incorporated by reference herein.

TECHNICAL FIELD

The present disclosure relates to a differential signaling transceiver and associated method of operation and computer program. In particular, although not exclusively, present disclosure relates to at least one of a CAN device, a CAN transceiver, and a CAN controller, and to at least one of a method for operating a CAN device, a CAN transceiver, and a CAN controller. The present disclosure further relates to a CAN bus system comprising CAN devices, and a method for operating a CAN bus system comprising CAN devices.

BACKGROUND

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard. However, it is of interest to allow backwards compatibility between all the CAN flavours, for example, CAN XL with CAN FD.

According to a first aspect of the present disclosure, there is provided a transceiver comprising:
a transmitter for transmitting, based on an input signal, a transmitter output voltage to a differential signaling bus,
the transceiver configured to:
generate, from the input signal, a copy of the transmitter output voltage to provide an expected differential bus voltage;
measure a differential bus voltage from the differential signaling bus; and
detect an error frame on the differential signaling bus based on a comparison between the measured differential bus voltage and the expected differential bus voltage.

In one or more embodiments the comparison comprises:
determining a difference between the expected differential bus voltage and the measured differential bus voltage signal;
comparing the difference with a threshold; and
identifying the presence of the error frame on the differential signaling bus if the difference exceeds the threshold. The difference between the expected differential bus voltage and the measured differential bus voltage signal may be provided as a voltage or as a current. The threshold may be a threshold voltage or a threshold current.

In one or more embodiments the transceiver comprises another transmitter configured to generate the copy of the transmitter output voltage.

In one or more embodiments the transceiver comprises a first transconductance amplifier and a second transconductance amplifier, in which:
the first transconductance amplifier is configured to convert the expected differential voltage signal to a first current; and
the second transconductance amplifier is configured to convert the measured differential bus voltage signal from the differential signaling bus to a second current,
in which the transceiver is configured to determine a difference between the first current and the second current to determine the difference between the expected differential voltage signal and the measured differential bus voltage signal.

In one or more embodiments the transceiver comprises a low pass filter. The low pass filter may be configured to convert the difference between the first current and the second current into a voltage difference for comparison with the threshold. The low pass filter may be configured to convert the difference between the expected differential bus voltage and the measured differential bus voltage signal into a filtered voltage difference for comparison with the threshold. The low pass filter may comprise a resistor—capacitor, RC, circuit.

In one or more embodiments the transceiver comprises a comparator configured to compare the voltage difference with the threshold voltage.

In one or more embodiments the transceiver is configured to provide an indication of the frame error to a transceiver controller in accordance with an output of the comparator. The transceiver may be configured to determine that a collision has occurred when the voltage difference is greater than the threshold for a predetermined number of bit or symbol periods.

The predetermined number may be six.

In one or more embodiments the expected differential bus voltage is not an exact copy of the transmitter output voltage.

One or more aspects relate to error frame detection on a CAN bus. In one or more embodiments the transceiver is a CAN, CAN FD or CAN XL transceiver. The differential signaling bus may be a CAN bus. Collision detection may occur during a data phase. A CAN bus collision may occur in a period when two CAN nodes are transmitting during a data phase. The transmitter may drive the CAN bus with the transmitter output voltage. The transmitter output voltage may be a differential voltage for the CAN bus.

In one or more embodiments the CAN transceiver is configured to detect the collision during a data phase of CAN operation, in which the data phase contains symbols defined by a negative differential voltage level on the CAN bus.

In one or more embodiments the CAN transceiver is configured to detect the collision during a fast data phase of CAN operation.

In one or more embodiments the CAN controller is configured to operate in the arbitration mode in accordance with ISO 11898-1:2003.

In one or more embodiments the arbitration mode may be referred to as a slow mode. The controller may be configured to operate in the fast data phase in accordance with ISO 11898-2:2016 (CAN FD) or in accordance with the specification document CiA610-1, for example version 0.0.0.1 or 0.0.0.4. The transceiver may be configured to operate in the fast data phase in accordance with CiA 601-3, for example version 0.0.1.

According to a second aspect of the present disclosure there is provided a CAN node comprising:
a CAN transceiver; and
the CAN controller, in which the CAN controller is configured to:
provide the input signal to the CAN transceiver; and
switch to an arbitration mode of operation in response to the detection of the collision on the CAN bus.

According to a further aspect of the present disclosure there is provided a CAN network comprising:
a CAN bus;
at least one CAN node as described herein and configured to communicate with the CAN bus.

According to a further aspect of the present disclosure there is provided a method for operating a transceiver, which may be a CAN transceiver, comprising:
receiving an input signal from a controller;
transmitting, based on the input signal, a transmitter output voltage to a bus;
generating, from the input signal, a copy of the transmitter output voltage to provide an expected differential bus voltage;
measuring a differential bus voltage from the bus; and
detecting an error frame on the bus based on, or in accordance with, a comparison between the measured differential bus voltage and the expected differential bus voltage.

According to a further aspect of the present disclosure, computer program code is provided. There may be provided a non-transient computer readable medium comprising the computer program code. Computer program code may be provided that is configured to cause a processor to execute any method disclosed herein. Computer program code may be configured to cause a processor to control a transceiver to: receive an input signal from a transceiver controller, transmit, based on the input signal, a transmitter output voltage to a differential signaling bus, generate, from the input signal, a copy of the transmitter output voltage to provide an expected differential bus voltage, measure a differential bus voltage from the differential signaling bus, and detect an error frame on the differential signaling bus based on, or in accordance with, a comparison between the measured differential bus voltage and the expected differential bus voltage.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying drawings.

DRAWINGS

One or more embodiments will now be described by way of example only with reference to the accompanying drawings in which:

FIG. 1b shows an example schematic block diagram of a node on the CAN bus network of FIG. 1a;

DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

Figure 1A:
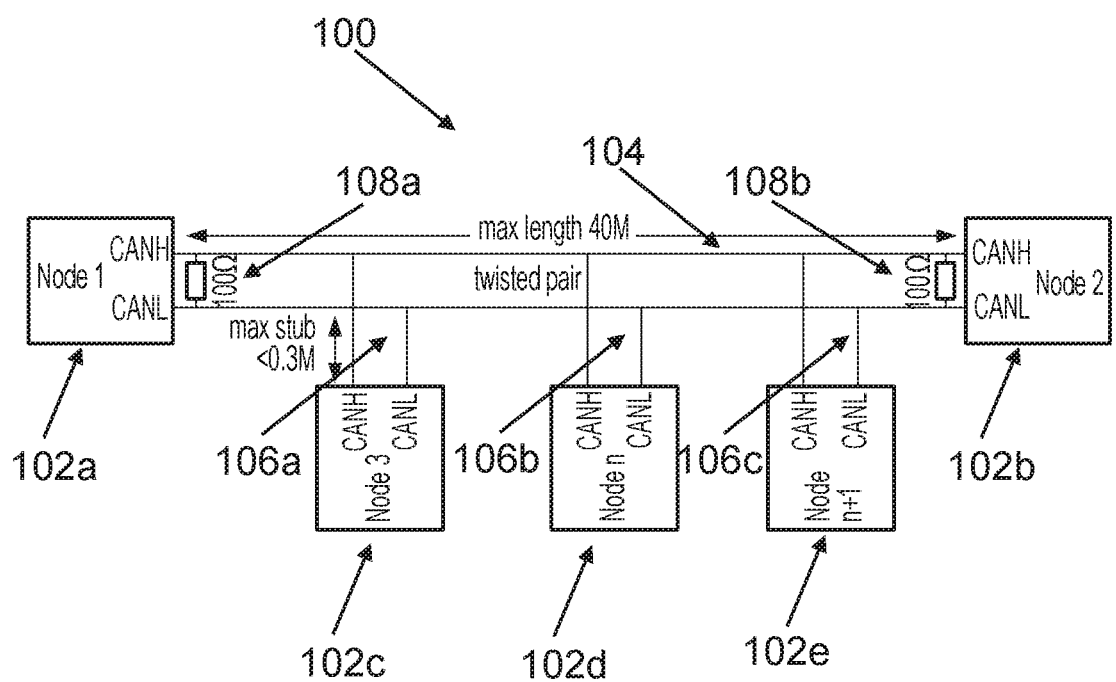
FIG. 1a shows an example schematic block diagram of a controller area network (CAN) bus network.

FIG. 1a illustrates a Controller Area Network (CAN) bus network 100 comprising multiple nodes, or devices 102a-e and a twisted pair cable providing a CAN bus 104 for communicating a differential signal between the multiple CAN nodes 102a-2 via stubs (e.g., stubs 106a-c). There are termination resistors 108a,b at the end nodes (node 1 and 2) 102a, 102b, as an example is shown in FIG. 1a.

Figure 1B:
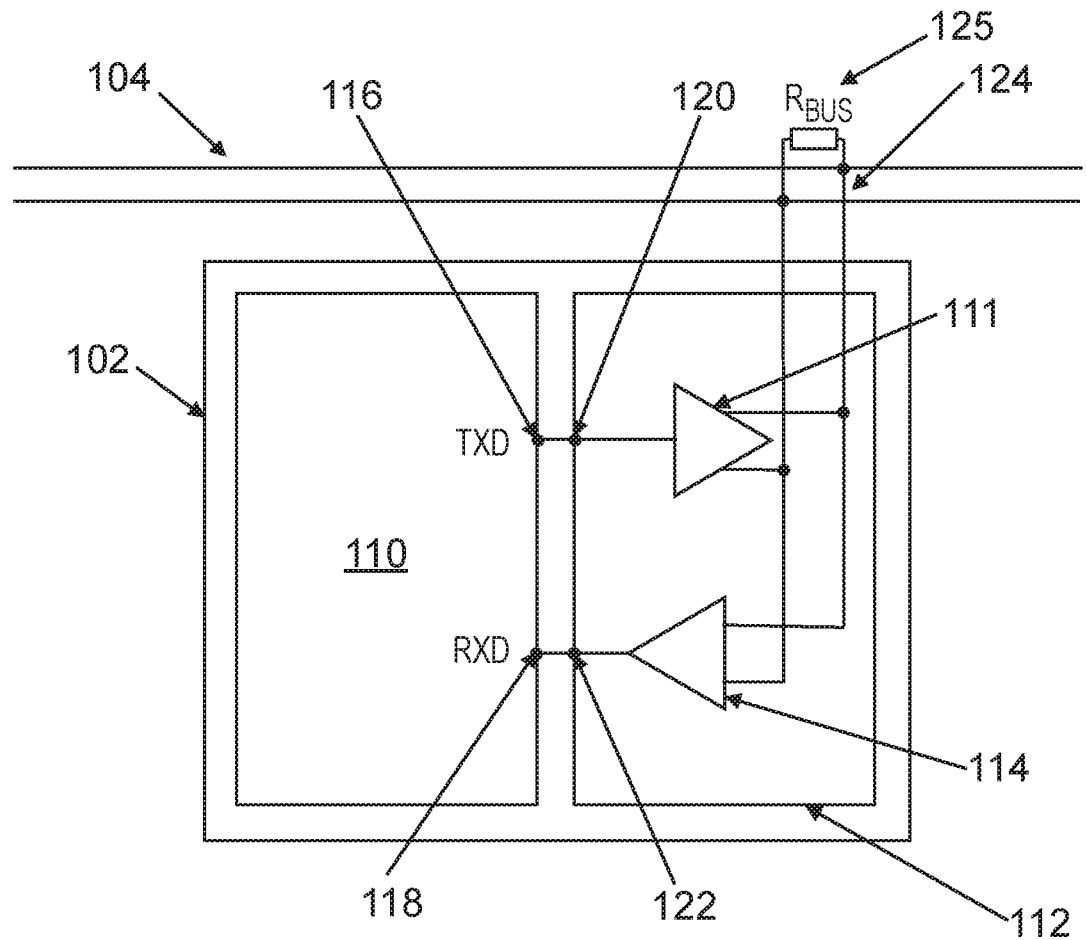

FIG. 1b illustrates a schematic block diagram of a CAN node, or device, 102 coupled to the CAN bus, 104 of FIG. 1a. The CAN node 102 comprises a CAN controller 110 and a CAN transceiver 112. The CAN controller 110 may be implemented by a processor, such as a microprocessor, configured to implement a CAN protocol of operation within the CAN bus network 100. The CAN transceiver 112 interfaces the CAN controller 110 with the CAN bus 104. In some examples, the CAN transceiver 112 can operate with no, or limited, circuitry for understanding or implementing the CAN protocol and so may be of relatively limited power consumption compared to the processor of the CAN controller 110.

The CAN controller 110 has a transmit output 116 and a receive input, 118. The CAN transceiver 112 has a transmit input 120, a receive output 122 and a bus terminal 124, which may also be referred to as a bus port. The bus terminal 124 may comprise a bus terminal resistor (RBus) 125. The bus terminal 124 is coupled to the two signal lines of the CAN bus 104. The transmitter output 116 of the CAN controller 110 is coupled to the transmit input 120 of the CAN transceiver 112. The receive input 118 of the CAN controller 110 is coupled to the receive output 122 of the CAN transceiver 112.

The CAN transceiver 112 comprises a transmitter 111 and a receiver 114. The transmitter 111 has an input coupled to the transmit input 120 of the CAN transceiver 110 and outputs connected to the CAN bus terminal 124 of the CAN transceiver 112. The transmitter 111 is configured to convert data received at the transmit input 120 of the CAN transceiver 112 to a differential signal for the CAN bus 104 via the bus terminal 124.

The receiver 114 has inputs coupled to the CAN bus terminal 124 and an output coupled to the receiver output 122 of the CAN transceiver 112. The receiver 114 is configured to convert a differential voltage signal on the CAN bus 104 into data for the CAN controller 110. The general architecture of the CAN node shown in FIG. 1b applies equally to all flavours of CAN, including CAN FD and the proposed CAN XL protocol.

Figure 2:
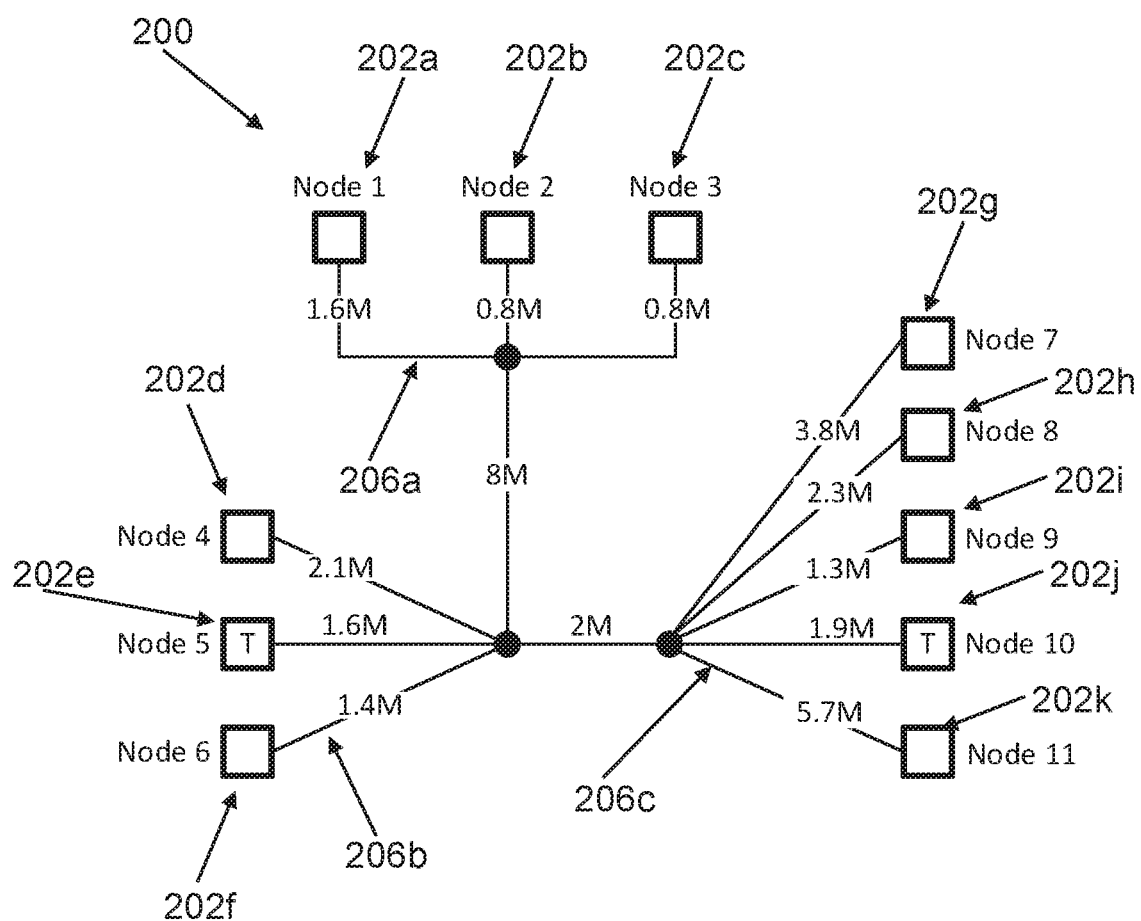
FIG. 2 shows an example CAN network topology.

FIG. 2 illustrates an example CAN network topology 200 comprising a plurality of nodes 202a-k and stubs (e.g., stubs 206a-c). The stubs (e.g., stubs 206a-c) in general need to be short in order to avoid long lasting reflections from open cable ends to be able to meet a higher speed. An example of a CAN network topology 200 is depicted in FIG. 2 with termination resistors located at node 5 (202e) and node 10 (202j) (as indicated by "T").

When any of the nodes (e.g. 1, 2, 3, 7 and 11—nodes 202a,b,c,g and k) that are furthest away from the termination resistors (node 5, 10—nodes 202e,j) starts sending data, reflections in the network will cause signal disturbances. These signal disturbances can be problematic when detecting collisions, as will be appreciated from the discussion below with reference to FIG. 3.

Figure 3:
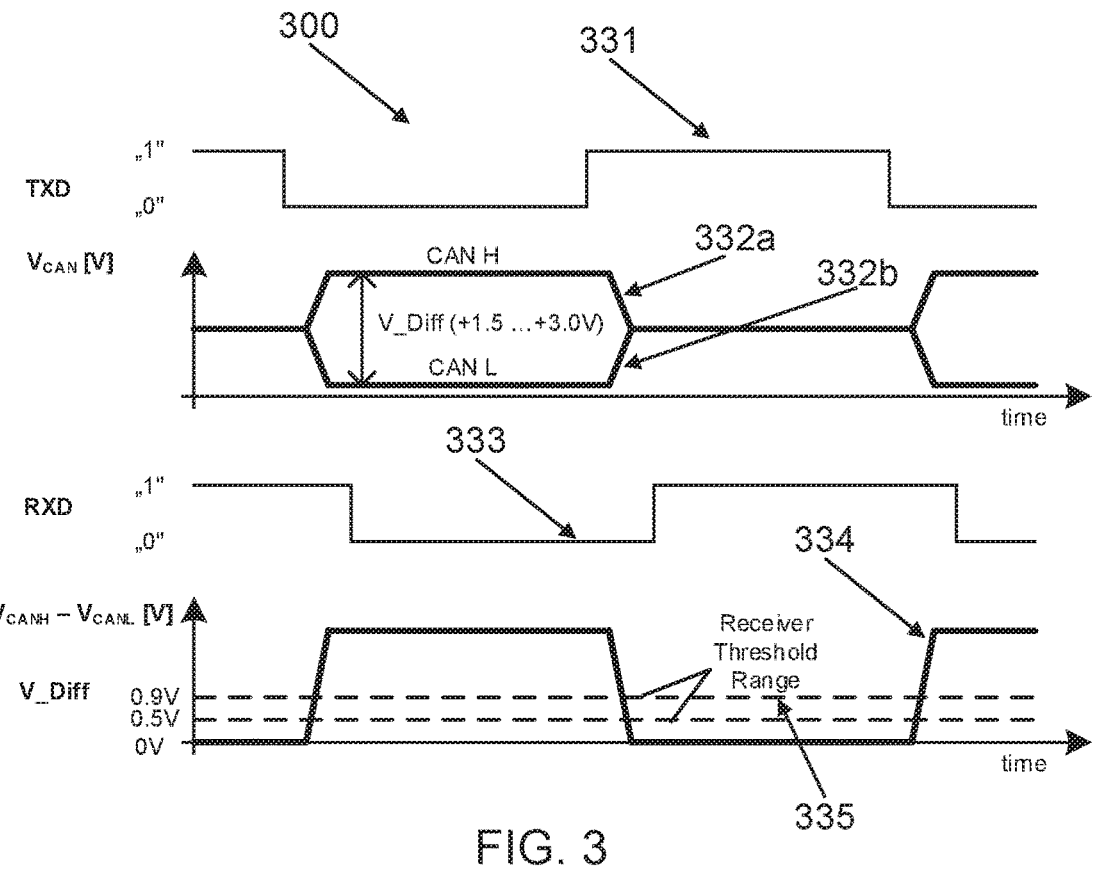
FIG. 3 shows a CAN physical voltage level scheme.

FIG. 3 illustrates a CAN physical voltage level scheme 300 according to ISO11898-2:2016. The slow phase (arbitration) of a CAN XL frame uses the CAN level scheme according to ISO11898-2:2016 (SLOW mode). The CAN physical voltage level scheme 300 is represented by corresponding signals, including a logic level signal 331 on a transmitter input (TXD) of a CAN transceiver, a high CAN bus voltage ($V_{CANH}$) 332a, a low CAN bus voltage ($V_{CANL}$) 332b, a logic level signal 333 on a receiver output (RXD) of the CAN transceiver and a differential voltage (V_Diff) 334. The differential voltage (V_Diff) 334 is defined in the CAN physical voltage level scheme 300 as $V_{CANH}$-$V_{CANL}$. V_Diff 334 is shown alongside a receiver threshold range 335.

In the CAN physical voltage level scheme 300 a V_Diff 334 value above 0.9V corresponds to the CAN bus being in a dominant state (logic state "0")—compare V_Diff 334 with receiver threshold range 335. Conversely, V_Diff 334 values below 0.5V correspond to the CAN bus being in a recessive state (logic state "1"). Intermediate values of V_Diff 334—i.e., between 0.5V and 0.9V—correspond to an undefined state on the CAN bus This disclosure generally relates to detecting error frames within a CAN network or CAN network topology, such as those described above with reference to FIGS. 1a and 2. An error frame in CAN may be defined as six dominant bits that will generate a stuff bit error in all nodes. In the physical layer of CAN (ISO11898-2) a dominant bit is defined as a certain differential voltage driven by a low ohmic impedance. Recessive is zero differential voltage while the output is high ohmic. This guarantees that a dominant level always overrules a recessive level and that an error frame is received by all nodes in the network. In the definition of CAN XL (taskforce running in CiA610-2), during the data phase the bit may be coded with positive or negative differential voltage driven by a low ohmic impedance. This means that an error frame (as defined in ISO11898-2) is not guaranteed to drive the bus voltage to the dominant state.

The CAN XL protocol is a variant that targets higher baud-rates (>10 Mbps) compared to CAN/CAN FD. This speed increase can be realized with a different bus voltage level scheme for the data phase compared to the known CAN/CAN FD bus voltage level scheme. This means that the CAN XL transceiver needs to operate in two different modes, which may be referred to as "slow" (during arbitration phase) and "fast" (during data phase). All nodes in the network may be synchronized to the same operating mode for reliable communication and error detection. A CAN XL controller may be able to switch a CAN XL transceiver between these two modes. This switching may be achieved by a number of mechanisms and a particular mechanism to implement this switching is not part of the present disclosure. The CAN XL node, for example, the transceiver, in particular, the transmitter, should be able to detect an error frame (six dominant bits in a row with slow (arbitration) bit timing) on the bus while operating in the fast mode. In the CAN standard it has been defined that the node which has won arbitration, is the only one allowed to transmit on the bus during the data phase. If a CAN controller (CAN/CAN FD/CAN XL) in a receiving node is detecting an error, it will transmit an error frame (long dominant, minimum of 6 consecutive slow bits as defined in ISO11898-2) resulting in a collision on the bus. With the existing CAN bus voltage level scheme, a dominant level would always overrule the recessive levels, meaning a long dominant error frame would always be reliably detected. The new voltage level scheme of CAN XL in the fast mode is not dominant nor recessive but level "0" or level "1". Since the level "0" and level "1" are actively driven on the CAN bus, a dominant level driven by another node will result in undefined bus voltage levels and the error frame is not reliable detected anymore.

An objective for CAN XL is that the possible communication speed shall be brought towards the maximum of what is physically possible. The level scheme as defined in the ISO11898-2:2016 is not optimized for that purpose due to several reasons. First, the arbitration mechanism needs to make sure that the bus becomes relatively high-ohmic (this is why that state is called "recessive") for the logical state "1" (high). This high ohmic state can be overridden by another sender (another node on the network) with a low-ohmic "0" (this is, why it is called "dominant"). Second, this same mechanism is used through all the CAN frames to signal a detected error on the bus lines. Any node may override a sender at any time during its recessive bit phases and with that, stop a transmission on the fly. "High ohmic" driven bits are rather slow and have other draw backs in combination with true bus wire harness. In practice, a wire harness may have parasitic capacitances to other wires. These capacitances have an impact on the bus signal integrity, especially when the bus is driven high ohmic. For example, long physical bus cables with multiple branches may create a lot of reflections and may corrupt the high-ohmic bits. This is why CAN XL proposes to use a level scheme and driver strength, which is optimized for maximum signal performance on the bus lines.

Figure 4:
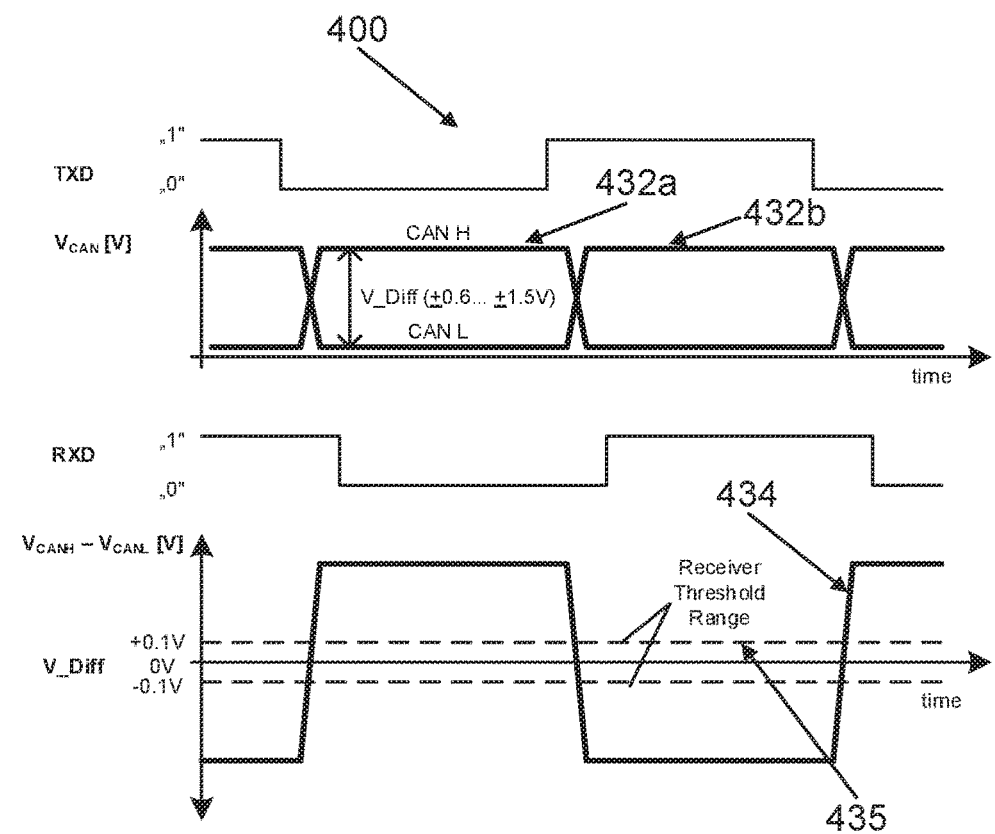
FIG. 4 shows a proposed CAN XL physical voltage level scheme.

FIG. 4 illustrates a proposed CAN XL physical voltage level scheme 400. The proposed CAN XL physical voltage level scheme 400 corresponds to a CAN XL bus level scheme in a fast, data phase mode of operation. The proposed CAN XL physical voltage level scheme 400 is similar to the CAN physical voltage level scheme 300 shown in FIG. 3 in terms of corresponding signals. Corresponding signals in the proposed CAN XL physical voltage level scheme 400 include a high CAN bus voltage ($V_{CANH}$) 432a, a low CAN bus voltage ($V_{CANL}$) 432b and a differential voltage (V_Diff) 434, defined as $V_{CANH}$-$V_{CANL}$. The differential voltage (V_Diff) 434 is shown alongside a receiver threshold range 435.

The CAN XL physical voltage level scheme 400 will have three different threshold levels to support. A first threshold (not shown in FIG. 4) is around the well-known ISO11898-2:2016 standard levels between differential voltage (V_Diff) 434 values of +0.5V and +0.9V, used for the backwards compatible CAN arbitration. The second threshold—represented by the receiver threshold range 435 of ±0.1V in FIG. 4—is related to fast CAN XL data communication around a differential voltage (V_Diff) 434 value of 0V. The third threshold (not shown in FIG. 4) is typically −0.6 V and has a maximum level that is lower than the minimum level of the second threshold (e.g., −0.3V . . . −0.4V).

Since the arbitration and bus access stays the same in CAN XL (to provide backwards compatibility with CAN), a CAN XL Transceiver may make use of the enhanced physical voltage level scheme only after the arbitration is done, or complete, and the CAN XL ECU has won the bus access. At that moment in time the CAN XL transceiver (of the node that has won the bus access) may switch to the new level scheme and boost the speed on the bus wires to the physical maximum; for example, in the CAN XL data phase exemplified in FIG. 4. Intentionally CAN XL does not allow anybody to override data bits, the high ohmic output behaviour could be avoided and all bit levels are driven with optimum strength.

Aspects of the present disclosure relate to creating an internal "shadow" transmitter in which its differential output signal is compared with the differential bus signal, and when, in particular, after filtering, a voltage shift is detected a logic output signals that an error frame, for example, comprising 6 consecutive dominant bits, is detected. That is, the additional "shadow" transmitter allows the transceiver to compare the expected differential bus voltage with the actual differential bus voltage. This allows a node within CAN to detect an error frame in case the CAN bus is still driven low ohmic. This scenario can happen, for example, during the data phase of CAN XL or, for example, during the active recessive time after a dominant to recessive transition of a CAN FD Signal Improvement Capability (CAN FD SIC) transceiver.

Figure 5:
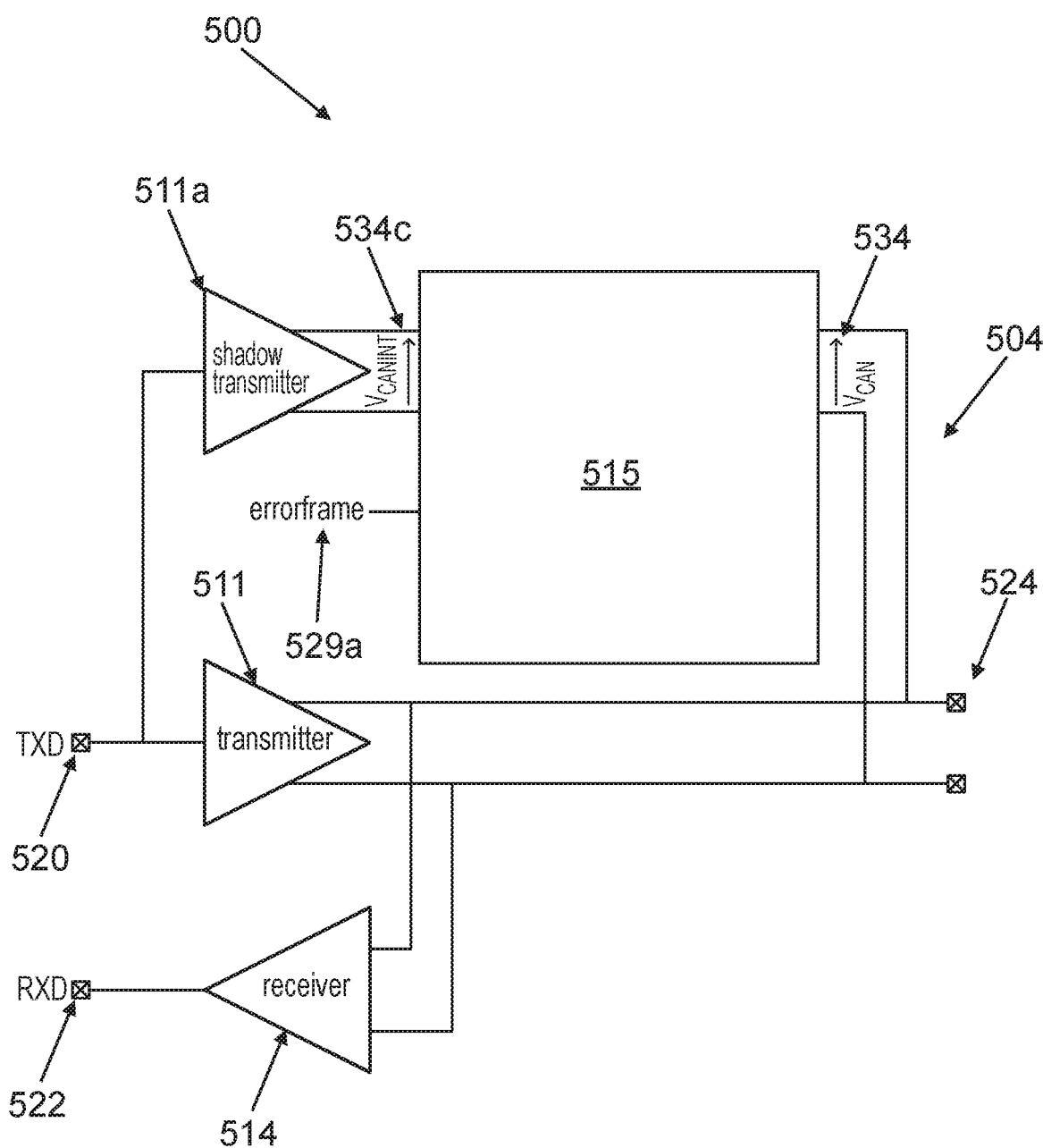
FIG. 5 shows an example schematic block diagram of a transceiver configured for error frame detection.

FIG. 5 shows an example schematic block diagram of a transceiver 500 configured for error frame detection. The transceiver 500 is similar to the CAN transceiver illustrated in FIG. 1b, in that it comprises a first transmitter 511 and a receiver 514. The transceiver 500 of FIG. 5 further comprises a second transmitter 511a, which may also be referred to as a shadow transmitter, and an error frame detection unit 515.

The transmitter 511 has an input coupled to a transmit input 520 of the transceiver 500 and outputs connected to a differential signaling bus terminal 524. The transmitter 511 is configured to convert data received at the transmit input 520 to a differential signal for a differential signaling bus 504 via the differential signaling bus terminal 524.

The receiver 514 has inputs coupled to the differential signaling bus terminal 524 and an output coupled to a receive output 522 of the transceiver 500. The receiver 514 is configured to convert, via the differential signaling bus terminal 524, a differential signal on the differential signaling bus 504 into data for a transceiver controller.

The second transmitter 511a has an input coupled to the transmit input 520 of the transceiver 500 and is configured to generate, from an input signal provided to the transmit input 520 of the transceiver 500, an internal differential voltage ($V_{CANINT}$) 534c, or expected differential bus voltage. The internal differential voltage ($V_{CANINT}$) 534c may be an exact copy of, or other signal that corresponds to, the differential signal generated by the first transmitter 511. The second transmitter 511a is further configured to provide the internal differential voltage ($V_{CANINT}$) 534c to the error frame detection unit 515.

The error frame detection unit 515 is configured to measure a differential voltage signal ($V_{CAN}$) 534 from the differential signaling bus terminal 524 and receive the internal differential voltage ($V_{CANINT}$) 534c from the second transmitter 511a. The error frame detection unit 515 is further configured to detect an error frame on the differential signaling bus based on a comparison between the differential voltage signal ($V_{CAN}$) 534 and the internal differential voltage ($V_{CANINT}$) 534c. For example, the error frame detection unit 515 is configured to provide an error frame output (errorframe) 529a based on the comparison between the differential voltage signal ($V_{CAN}$) 534 and the internal differential voltage ($V_{CANINT}$) 534c. For example, the presence of a collision on the CAN bus 524 may cause the differential voltage signal ($V_{CAN}$) 534 to be substantially different from the internal differential voltage ($V_{CANINT}$) 534c for a number of bit or symbol periods. The error frame detection unit 515 may therefore be configured to determine that a collision has occurred in accordance with a comparison between the measured differential bus voltage and the expected differential bus voltage, and in particular when the measured differential bus voltage is greater than the expected differential bus voltage by at least a threshold amount for a predetermined number of bit or symbol periods.

Figure 6:
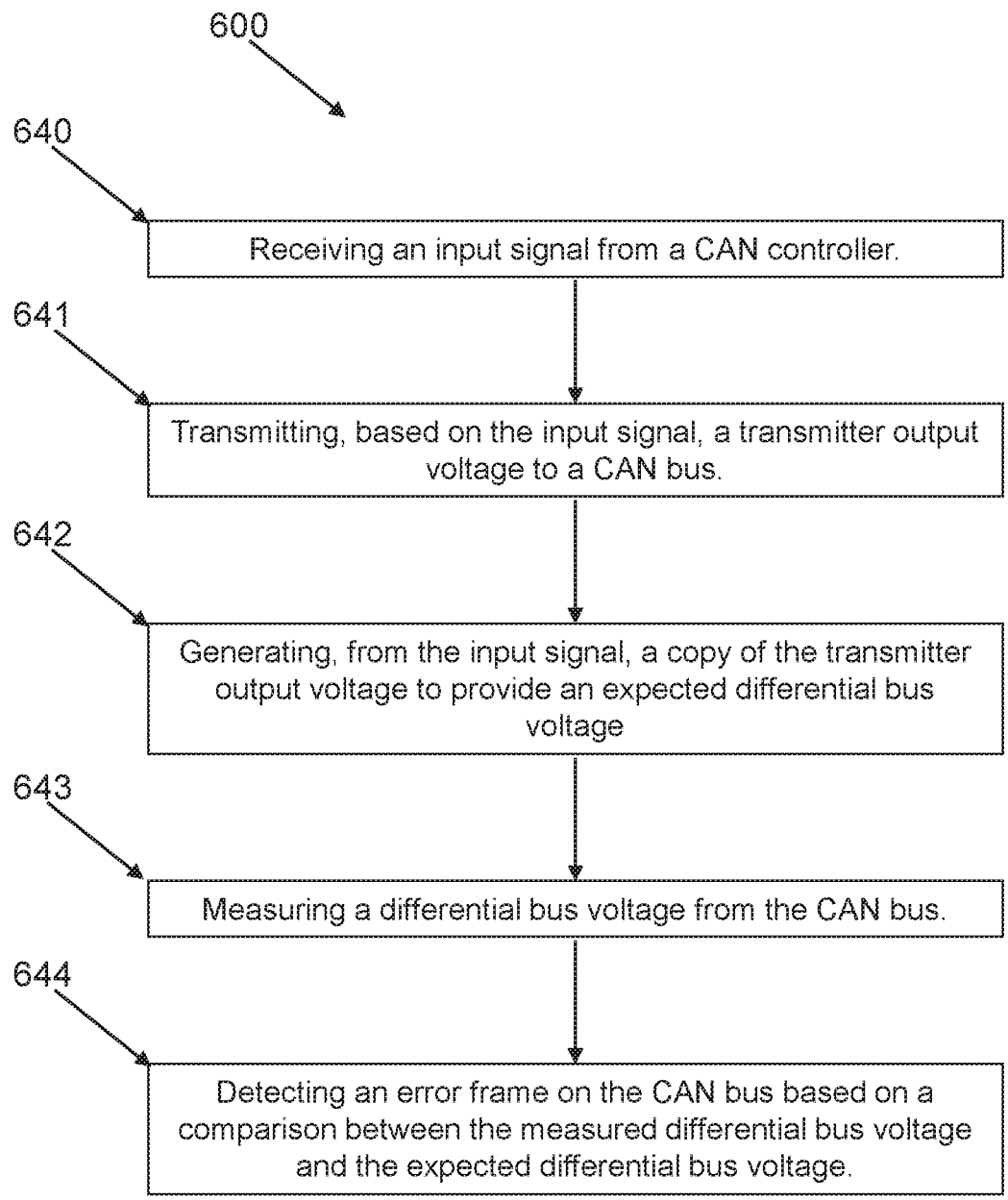
FIG. 6 illustrates a method of operating the transceiver of FIG. 7.

FIG. 6 illustrates a method 600 for operating a transceiver, such as the transceiver 500 of FIG. 5. An input signal is received 640 from a transceiver controller. A transmitter output voltage is transmitted 641 to a differential signaling bus based on the input signal. A copy of the transmitter output voltage is generated 642 from the input signal to provide an expected differential bus voltage. A differential bus voltage is measured 643 from the differential signaling bus. An error frame is detected 644 on the differential signaling bus based on, or in accordance with, a comparison between the measured differential bus voltage and the expected differential bus voltage.

Figure 7:
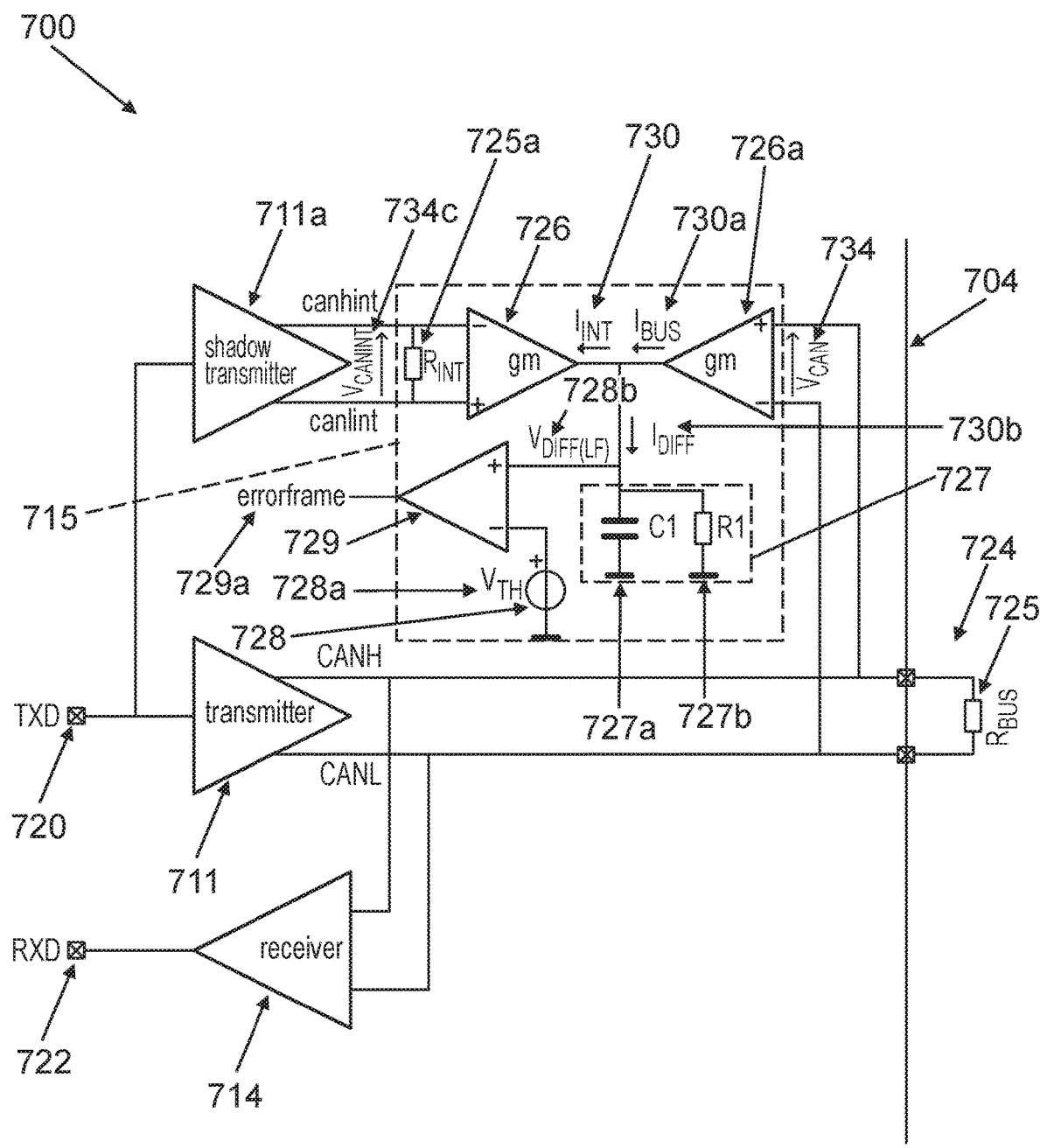
FIG. 7 shows an example schematic block diagram of a CAN transceiver configured for error frame detection.

FIG. 7 shows an example of the present disclosure in more detail. That is, FIG. 7 shows an example schematic block diagram of a CAN transceiver 700 configured for error frame detection. The CAN transceiver 700 is similar to the CAN transceiver illustrated in FIG. 5, in that it comprises a first transmitter 711, a second transmitter 711a, a receiver 714 and an error frame detection unit 715, arranged in the same way as described previously with reference to FIG. 5.

The error frame detection unit 715 in this example comprises a first transconductance ampliFier 726, a second transconductance amplifier 726a, a parallel filter circuit 727 and an error frame comparator 729.

The outputs (canhint, canlint) of the second transmitter 711a are connected to inputs of the first transconductance amplifier 726. An internal load resistor ($R_{INT}$) 725a is provided in parallel with the outputs (canhint, canlint) of the second transmitter 711a and the inputs of the first transconductance amplifier 726. The outputs (canhint, canlint) of the second transmitter 711a and the internal load resistor ($R_{INT}$) 725a are configured to provide an internal CAN differential bus voltage ($V_{CANINT}$) 734c to the first transconductance amplifier 726. The first transconductance amplifier 726 is configured to output a current representation (INT) 730 of the internal CAN differential bus voltage ($V_{CANINT}$) 734c.

The second transconductance amplifier 726a has inputs connected to the CAN bus terminal 724. The second transconductance amplifier 726a is configured to output a current representation ($I_{Bus}$) 730a of a CAN differential bus voltage ($V_{CAN}$) 734.

The parallel filter circuit 727 is provided by a capacitor (C1) 727a and a resistor (R1) 727b in parallel with the capacitor (C1) 727a in this example. The parallel filter circuit 727 is provided between the outputs of the first and second transconductance amplifiers 726, 726a and ground. A difference current ($I_{Diff}$) 730b—defined as a difference between the current representation (INT) 730 of the internal CAN differential bus voltage ($V_{CANINT}$) 734c and the current representation ($I_{Bus}$) 730a of the CAN differential bus voltage ($V_{CAN}$) 734—is provided to the parallel filter circuit 727. The filter circuit 727 integrates the difference current ($I_{DIFF}$) 730b as a function of time. In this way, the parallel filter circuit 727 is configured to filter and convert the difference current 730b to a difference voltage ($V_{DIFF(LF)}$) 728b which rises during a period when the output of the second transconductance amplifier 726a is greater than an output of the first transconductance amplifier 726, as explained in further detail below.

The difference voltage ($V_{DIFF(LF)}$) 728b from the parallel filter circuit 727 is provided to a first input of the error frame comparator 729. A threshold voltage ($V_{TH}$) 728a from a threshold voltage source 728 is provided a second input of the error frame comparator 729. The error frame comparator 729 is configured to provide an error frame comparator output (errorframe) 729a. The error frame comparator output (errorframe) 729a indicates detection of an error frame on the CAN bus by the error frame comparator 729 when the difference voltage ($V_{DIFF(LF)}$) 728b exceeds the threshold voltage ($V_{TH}$) 728a.

The internal shadow transmitter 711a is driven with the same TXD input signal as the first transmitter 711. The drive characteristics and internal load resistor ($R_{INT}$) 725a of the internal shadow transmitter 711a are chosen such that the internal CAN differential voltage ($V_{canhint}-V_{canlint}$) 734c is equal to the CAN differential bus voltage ($V_{CAN}=V_{CANH}-V_{CANL}$) 734 when the CAN transmitter 711 is loaded with a resistor RBus 725 (typically 60 Ohm). The internal CAN differential voltage 734c is converted into a current (INT) 730 with the first transconductance amplifier 726. Also, the CAN differential bus voltage ($V_{CAN}$) 734 is converted into a current ($I_{Bus}$) with the second transconductance amplifier 730a. Both currents are subtracted, resulting in a difference current ($I_{DIFF}$) 730b.

If the internal shadow transmitter voltage (i.e., the internal CAN differential bus voltage ($V_{CANINT}$) 734c) and the bus voltage (i.e., the CAN differential bus voltage ($V_{CAN}$) 734) are equal, the difference current ($I_{DIFF}$) 730b will be zero. The difference current $I_{DIFF}$ 730b flows into the parallel filter circuit 727 of the capacitor (C1) 727a and the resistor (R1) 727b which act as a low pass filter and at the same time convert the difference current $I_{DIFF}$ 730b into a difference voltage $V_{DIFF(LF)}$ 728b. If the difference current is $I_{DIFF}$ 730b zero, the filtered difference voltage $V_{DIFF(LF)}$ 728b is also zero and the error frame comparator 729 outputs a logic zero. How an error frame is detected is explained in the following paragraphs.

In other examples, an error frame on the CAN bus may be detected without the first and second transconductance amplifiers 726, 726a. In such examples, the difference voltage $V_{DIFF(LF)}$ 728b is determined from the internal CAN differential bus voltage ($V_{CANINT}$) 734c and the CAN differential bus voltage ($V_{CAN}$) 734 without converting these bus voltages to currents. The difference voltage $V_{DIFF(LF)}$ 728b may be filtered using a low pass filter (e.g., a resistor-capacitor circuit with the resistor in series with difference voltage $V_{DIFF(LF)}$ 728b and the capacitor to ground) before being provided to the first input of the error frame comparator 729.

Figure 8:
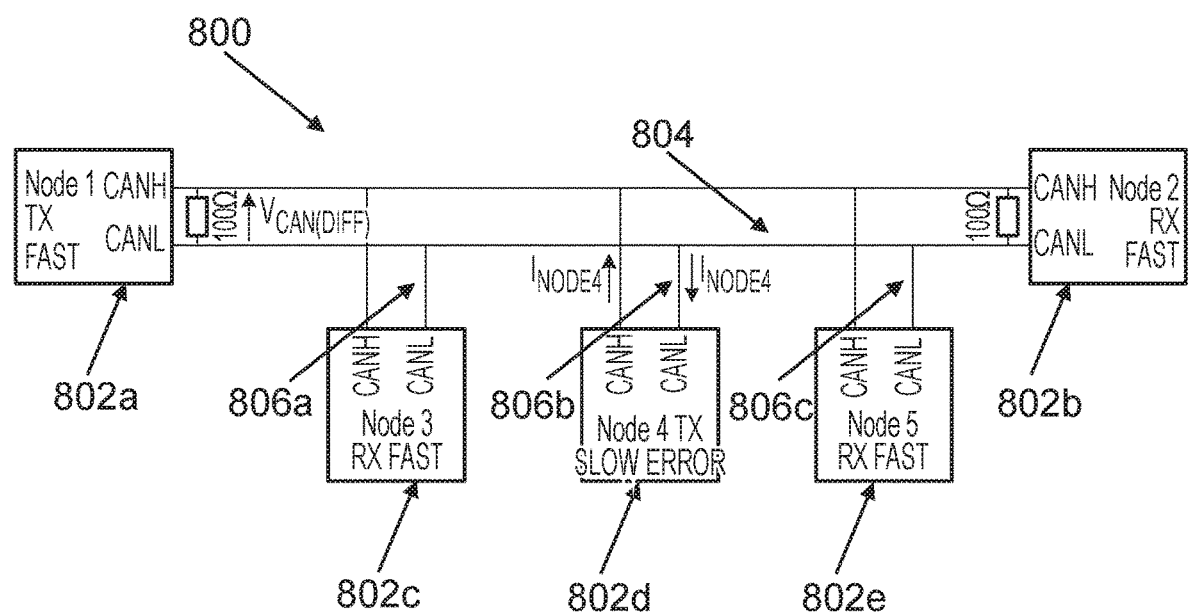
FIG. 8 shows an example schematic block diagram of a CAN XL bus network.

FIG. 8 illustrates an example schematic block diagram of a CAN XL bus network 800. The example network topology shown in FIG. 8 has an end-to-end termination with short stubs and thus no significant signal disturbances. The topology of the, CAN XL bus network 800 is similar to that described previously with reference to FIG. 1a in that it comprises a plurality of CAN XL nodes, or devices, 802a-e, which are each coupled to a CAN bus 804 for communicating a differential signal between the multiple CAN XL nodes 802a-e via stubs (e.g., stubs 806a-c). Each CAN XL node 802a-d may comprise a CAN controller as described above with reference to FIG. 1b and CAN transceiver as described with reference to FIG. 5 or FIG. 7. The CAN bus 804 comprises two signal lines for communicating a differential signal between the plurality of CAN XL nodes 802a-d.

The CAN XL bus network 800 of FIG. 8 differs from the CAN bus network of FIG. 1a in that it is shown in a particular state of operation. Node 1 (802a) has won arbitration and is transmitting during the data phase in the fast mode of CAN XL (TX FAST). All other nodes 802b-e are receiving the data (RX FAST) in a first period. At a certain time, node 4 (802d) has detected an error and its CAN XL controller switched back to slow mode and starts transmitting 'DOMINANT' as an error frame (TX SLOW ERROR) in a second period.

Figure 9:
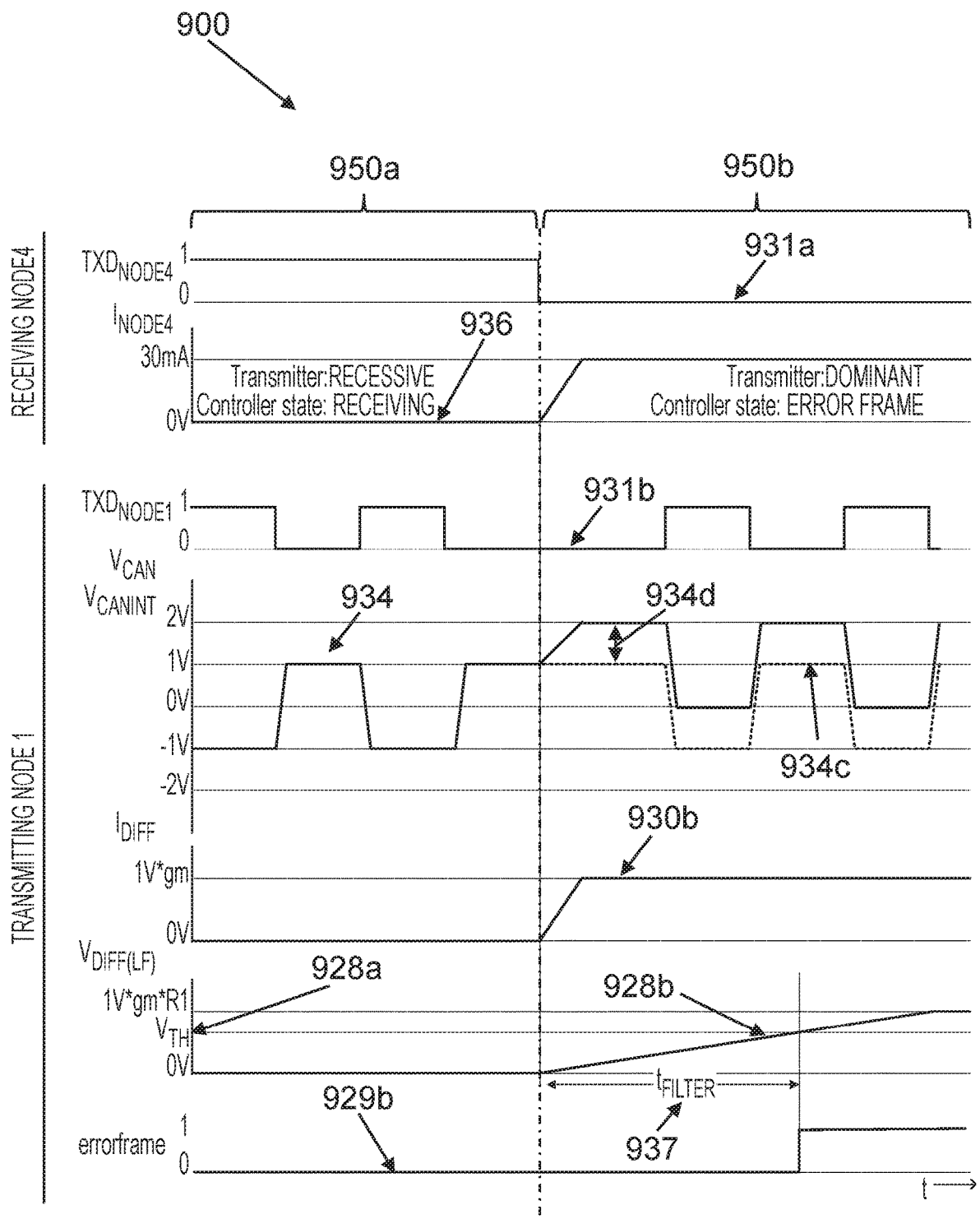
FIG. 9 illustrates a timing diagram corresponding to the CAN XL bus network of FIG. 8.

FIG. 9 illustrates a timing diagram 900 for the CAN XL bus network of FIG. 8. The timing diagram 900 demonstrates a transition from a period changes that occur when the CAN XL bus network of FIG. 9 transitions from the first period 950a to the second period 950b. Specifically, the timing diagram 900 shows a logic level signal on a transmitter input (TXD-$_{NODE4}$) 931a of a CAN XL transceiver of node 4 (802d) and a current ($I_{NODE4}$) 936 between node 4

(502d) and the CAN bus 804. The timing diagram 900 also shows a logic level signal on a transmitter input (TXD$_{NODE1}$) 931b of the CAN XL transceiver of node 1 (802a), a CAN differential bus voltage (V$_{CAN}$—solid line) 934, an internal CAN differential bus voltage (V$_{CANINT}$—dashed line) 934c, a difference current (I$_{DIFF}$) 930b, a difference voltage (V$_{DIFF(LF)}$) 928b, and an error frame comparator output (errorframe) 929b. The difference voltage (V$_{DIFF(LF)}$) 928b is shown alongside a threshold voltage (V$_{TH}$) 928a and a filter period (t$_{filter}$) 937.

The internal CAN differential bus voltage (V$_{CANINT}$) 934c corresponds to the differential voltage output of the second transmitter 711a of the CAN transceiver 700 of FIG. 7. The difference current (I$_{DIFF}$) 930b corresponds to a difference between the current representation (I$_{INT}$) 730 of the internal CAN differential bus voltage (V$_{CANINT}$) 934c and the current representation (I$_{Bus}$) 730a of the CAN differential bus voltage (V$_{CAN}$) 934. The difference voltage (V$_{DIFF(LF)}$) 928b corresponds to the filtered voltage 728b provided by the parallel filter circuit 727 of the CAN transceiver 700 of FIG. 7.

The timing diagram 900 in the first period 950a and the second period 950b can be generally understood as follows. The first period 950a (i.e., to the left of the dashed line in FIG. 9) corresponds to node 1 (802a) transmitting data to the CAN bus 804. Node 4 (802d) is receiving the data (RX FAST) in this first period 930a. That is, the transmitter of node 4 (802d) is in a 'RECESSIVE' state and its controller is in a 'RECEIVING' state. The data transmitted by node 1 (802a) is represented in the timing diagram 900 by the waveforms of the logic level signal on the transmitter input (TXD$_{NODE1}$) 931a of the CAN XL transceiver and the CAN differential bus voltage (V$_{CAN(DIFF)}$) 934. In the first period 950a the difference current (I$_{DIFF}$) 930b, the difference voltage (V$_{DIFF(LF)}$) 928b and the error frame comparator output (errorframe) 929b are each zero.

The second period 950b (i.e., to the right of the dashed line in FIG. 9) corresponds to node 4 (802d) detecting an error and transmitting 'DOMINANT' as an error frame, as described above, while node 1 (802a) continues to transmit data. The combination of node 1 (802a) and node 4 (802d) simultaneously transmitting data to the CAN bus 804 alters the waveform characteristics of the CAN differential bus voltage (V$_{CAN(DIFF)}$) 934 with respect to the internal CAN differential bus voltage (V$_{CANINT}$) 934a—see, for example, the 1V voltage shift 934d between the CAN differential bus voltage (V$_{CAN(DIFF)}$) 934 and the internal CAN differential bus voltage (V$_{DIFF(LF)}$) 928b.

The combination of node 1 (802a) and node 4 (802d) simultaneously transmitting data to the CAN bus 804 during the second period 950b causes the difference current (I$_{DIFF}$) 930b to increase to a value corresponding to the 1V voltage shift 934d multiplied by the conductance (gm) of the first 726 and second 726a transconductance amplifiers of the CAN transceiver 700 of FIG. 7. The increase in the difference current (I$_{DIFF}$) 930b causes the difference voltage (V$_{DIFF(LF)}$) 928b to increase to a value corresponding to the difference current (I$_{DIFF}$) 9xx (i.e., the voltage shift multiplied by the transconductance gm) multiplied by the resistance of the resistor (R1) 727b of the CAN transceiver 700 of FIG. 7. When the difference voltage (V$_{DIFF(LF)}$) 928b exceeds the threshold voltage (V$_{TH}$) 928a—that is, after the filter period (t$_{filter}$) 937—the error frame comparator output (errorframe) 929b toggles to logic level "1" to indicate detection of an error frame on the CAN bus 804.

When node 4 (802d) is recessive (I$_{NODE4}$=0 mA) the shadow transmitter voltage V$_{CANINT}$ 934c (dashed line in FIG. 9) is equal to bus voltage V$_{CAN}$ 934 (solid line in FIG. 9) and as a result I$_{DIFF}$ 930b is zero, V$_{DIFF}$ 928b is zero and below the threshold voltage V$_{TH}$ 928a. The error frame comparator signals 929b a logic "0" meaning that node 1 (802a) is the only transmitter on the bus 804 and that there is no other node transmitting dominant. When the CAN controller in node 4 (802d) detects an error condition it will start to transmit an error frame comprising 6 dominant bits which is minimum 6 μs in case of maximum arbitration speed of 1 Mbaud. The drive strength of the transmitter in node 4 (802d) is assumed worse case and is modelled as a dominant current source of 30 mA—see the maximum value of the current (I$_{NODE4}$) 936 between node 4 (802d) and the CAN bus 804 during the second period 950b. The minimum dominant voltage specified in ISO11898-2:2016 is 1.5V at a minimum load of 50 Ohm. This calculates into a minimum dominant current of 1.5/50=30 mA. In this example 1 the voltage swing of transmitter in node 1 (802a) is chosen 1V peak and the output driver impedance is 100 Ohm. The impedance seen by transmitter at node 4 (802d) is 100/3=33.33 Ohm (two 100 Ohm termination resistors and 100 Ohm driver impedance of node 1 in parallel). That calculates into a differential bus voltage shift 934d of 30*33.33=1V. Since the shadow transmitter 711a is not affected by the change on the bus, the differential voltage difference 934d results in an I$_{DIFF}$ 930b with the value of the transconductance (gm) times the voltage difference (1V). This current is filtered and converted into a voltage V$_{DIFF(LF)}$ 928b by the parallel filter circuit 727. When the length of the dominant pulse is longer compared to the filter time t$_{filter}$ 937 (defined by the product of the capacitance of the capacitor (C1) 727a and the resistance of the resistor (R1) 727b) the voltage on V$_{DIFF(LF)}$ 928b rises above a certain threshold voltage (V$_{TH}$) 928a and the error frame comparator 729 signals 729b a logic "1", meaning that an error frame has been detected. For the concept of detecting an error frame of a relative long dominant time, a low pass filter such as the parallel filter circuit 727 can be applied making the system robust against false error frame detection due to short disturbances on the bus.

Accordingly, in some examples the comparison comprises: determining a difference 728b between an expected differential bus voltage 734c and a measured differential bus voltage signal 734; comparing 729 the difference 728b with a threshold 728a; and identifying the presence of the error frame on a differential signaling bus 704 if the difference 728b exceeds the threshold 728a.

In some examples the transceiver 700 may comprise another transmitter 711a configured to generate the copy of the transmitter output voltage 734c. The transceiver 700 may comprise a first transconductance amplifier 726 and a second transconductance amplifier 726a, in which: the first transconductance amplifier 726 is configured to convert the expected differential voltage signal 734c to a first current 730; and the second transconductance amplifier 726a is configured to convert the measured differential bus voltage signal 734 from the differential signaling bus 704 to a second current 730a, in which the transceiver 700 is configured to determine a difference 730b between the first current 730 and the second current 730a to determine the difference between the expected differential voltage signal 734c and the measured differential bus voltage signal 734.

In some examples the transceiver 700 may comprise a low pass filter 727 configured to convert the difference between the first current and the second current into a voltage difference 728b for comparison 729 with the threshold voltage 728a. The low pass filter may comprise a resistor-capacitor, RC, circuit 727*a,b*. The CAN transceiver 700 may comprise a comparator 729 configured to compare the voltage difference 728*b* with the threshold voltage 728*a*. The CAN transceiver may be configured to provide an indication of the frame error to the CAN controller in accordance with an output of the comparator 729.

In some examples the expected differential bus voltage 734*c* may not be not an exact copy of the transmitter output voltage. The CAN transceiver 700 may be configured to detect the collision during a data phase of CAN operation, in which the data phase contains symbols defined by a negative differential voltage level on the CAN bus 104. The CAN transceiver 700 may be configured to detect the collision during a fast data phase of CAN operation.

Figure 10:
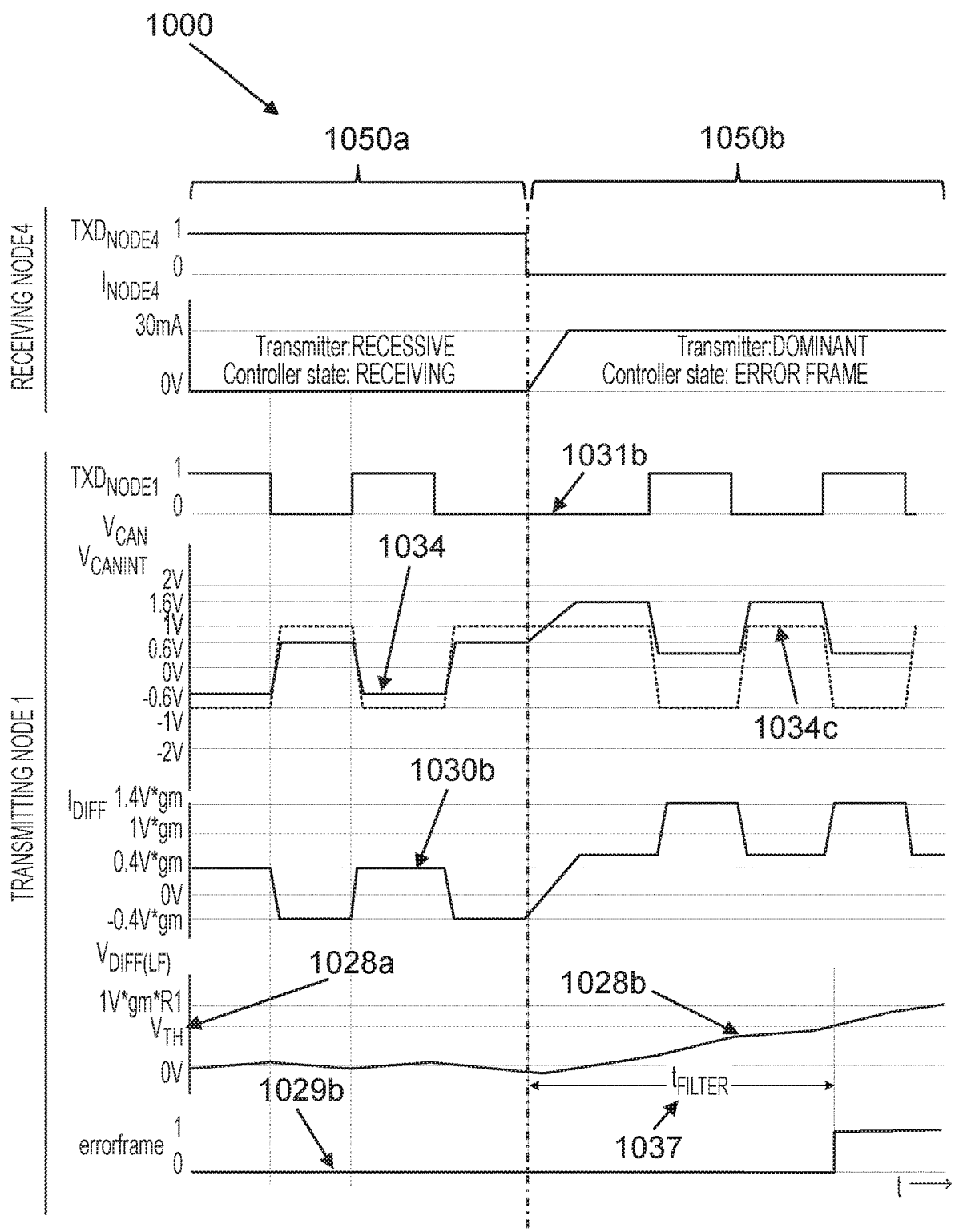
FIG. 10 illustrates a further timing diagram corresponding to the CAN XL bus network of FIG. 8.
Figure 11:
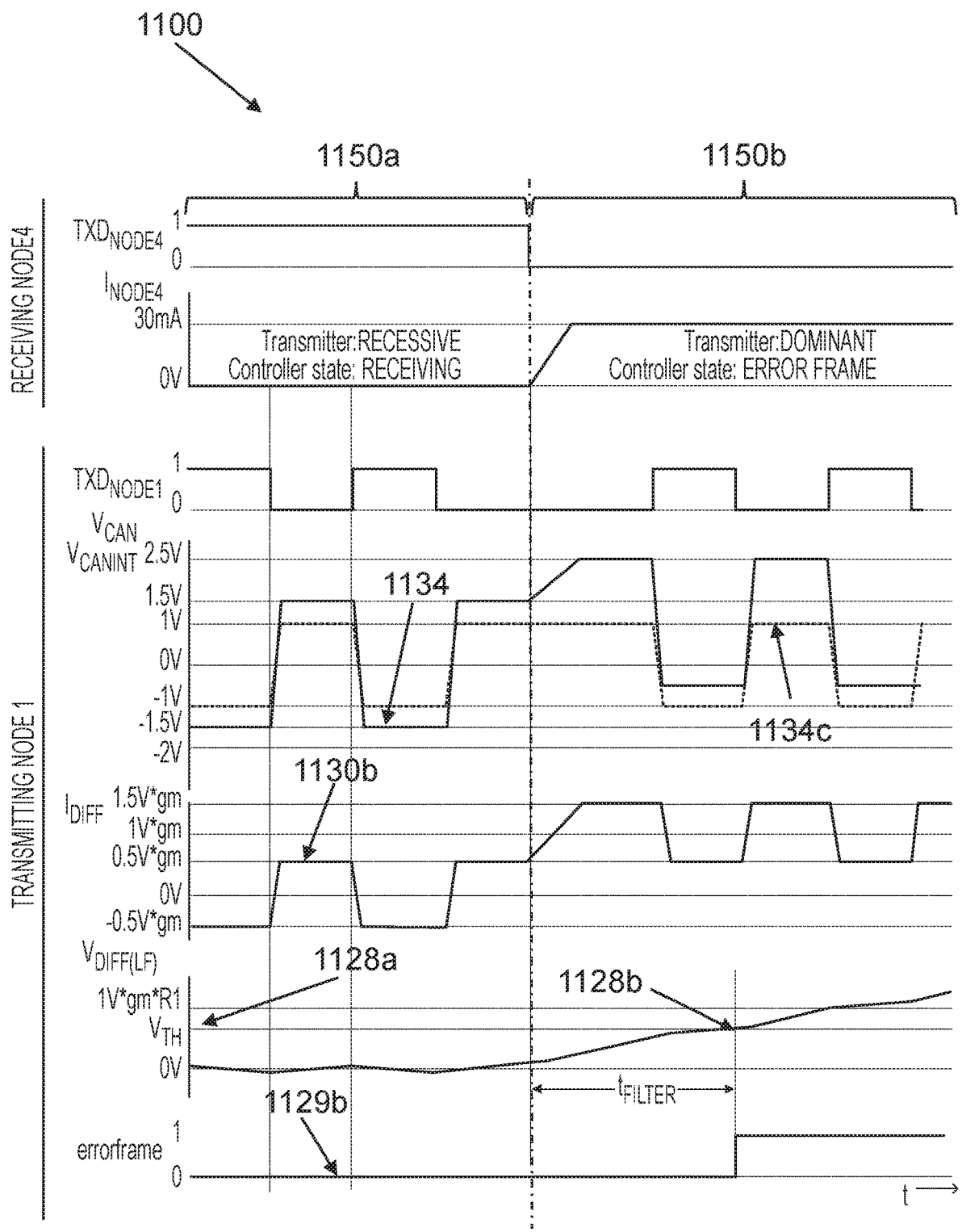
FIG. 11 illustrates a further timing diagram corresponding to the CAN XL bus network of FIG. 8.

The shadow transmitter 711*a* can be matched to the first transmitter 711 with respect to process spread, temperature and supply voltage, but the bus impedance variation cannot be matched, which will result in different voltage swings. In FIG. 10 and FIG. 11 the timing diagrams are drawn in the case of the peak bus voltage being different (lower or higher respectively) compared to the shadow transmitter voltage, as described in more detail below. In both cases the DC difference is zero and due to the filtering by the capacitor (C1) 727*a* and the resistor (R1) 727*b* the difference in peak voltage does not result in a false error frame detect, a situation that may otherwise arise if, for example, no filtering of the difference between the internal CAN differential bus voltage ($V_{CANINT}$) 934*c* and the CAN differential bus voltage ($V_{CAN(DIFF)}$) 934 took place.

FIG. 10 illustrates a further timing diagram 1000 for the CAN XL bus network of FIG. 8. The timing diagram 1000 of FIG. 10 is similar to the timing diagram 900 of FIG. 9, except that during the first period 1050*a* the CAN differential bus voltage ($V_{CAN}$—solid line) 1034 has a lower maximum output voltage (of 0.6V) than the internal CAN differential bus voltage ($V_{CANINT}$—dashed line) 1034*c* (maximum output voltage of 1V). The lower maximum output voltage of the CAN differential bus voltage ($V_{CAN}$) 1034 compared to the internal CAN differential bus voltage ($V_{CANINT}$) 1034*c* gives rise to a non-zero difference current ($I_{DIFF}$) 1030*b* during the first period 1050*a*.

Although the difference current ($I_{DIFF}$) 1030*b* during the first period 1030*b* is non-zero, its magnitude is insufficient to charge the capacitor (C1) 627*a* of the parallel filter circuit 627 while node 1 (802*d*) is transmitting data. See the fluctuations in the difference current ($I_{DIFF}$) 1030*b* between ±0.4V*gm as the logic level signal on the transmitter input (TXD$_{NODE1}$) 1031*b* toggles between logic level "0" and logic level "1". Consequently, the difference voltage ($V_{DIFF(LF)}$) 1028*b* does not exceed the threshold voltage ($V_{TH}$) 1028*a* and the error frame comparator output (errorframe) 1029*b* remains at logic level "0".

It is only during the second period 1050*b* of the timing diagram 1000 of FIG. 10 that the difference voltage ($V_{DIFF(LF)}$) 1028*b* increases to a value above the threshold voltage ($V_{TH}$) 1028*a*. This is because the combination of node 1 (802*a*) and node 4 (802*d*) simultaneously transmitting data to the CAN bus 804 causes the difference current ($I_{DIFF}$) 1030*b* to stay positive while the logic level signal on the transmitter input (TXD NODE1) 1031*b* toggles between logic level "0" and logic level "1", thereby allowing the capacitor (C1) 627*a* to continuously charge (and the difference voltage ($V_{DIFF(LF)}$) 1028*b* to continuously increase). Once the difference voltage ($V_{DIFF(LF)}$) 1028*b* increases above the threshold voltage ($V_{TH}$) 1028*a*—that is, after a period of time that exceeds the filter period ($t_{filter}$) 1037—the error frame comparator output (errorframe) 1029*b* toggles to logic level "1" to indicate detection of an error frame on the CAN bus 804, as described above with reference to FIG. 9.

FIG. 11 illustrates a further timing diagram 1100 for the CAN XL bus network of FIG. 8. The timing diagram 1100 of FIG. 11 is similar to the timing diagram 1000 of FIG. 10 except that during the first period 1150*a* the CAN differential bus voltage ($V_{CAN}$—solid line) 1134 has a higher maximum output voltage (of 1.5V) than the internal CAN differential bus voltage ($V_{CANINT}$) 1134*c* (maximum output voltage of 1V). The higher maximum output voltage of the CAN differential bus voltage ($V_{CAN}$) 1134 compared to the internal CAN differential bus voltage ($V_{CANINT}$) 1134*c* gives rise to a non-zero difference current ($I_{DIFF}$) 1130*b* during the first period 1150*a*.

The first 1150*a* and second 1150*b* periods of the timing diagram 1100 of FIG. 11 are similar to the first 1050*a* and second 1050*b* periods of the timing diagram 1000 of FIG. 10. In the timing diagram example of FIG. 11, however, the difference current ($I_{DIFF}$) 1130*b* is initially negative (compare with the difference current ($I_{DIFF}$) 1030*b* in the timing diagram 1000 of FIG. 10 that is initially positive). Once the difference current ($I_{DIFF}$) 1130*b* remains positive for a time sufficient to cause the difference voltage ($V_{DIFF(LF)}$) 1128*b* to exceed the threshold voltage ($V_{TH}$) 1128*a*, as is the case in the second time period 1150*b*, the error frame comparator output (errorframe) 1129*b* toggles to logic level "1". As described above with reference to FIGS. 9 and 10, the error frame comparator output (errorframe) 1129*b* toggling to logic level "1" indicates detection of an error frame on the CAN bus 804.

Figure 12:
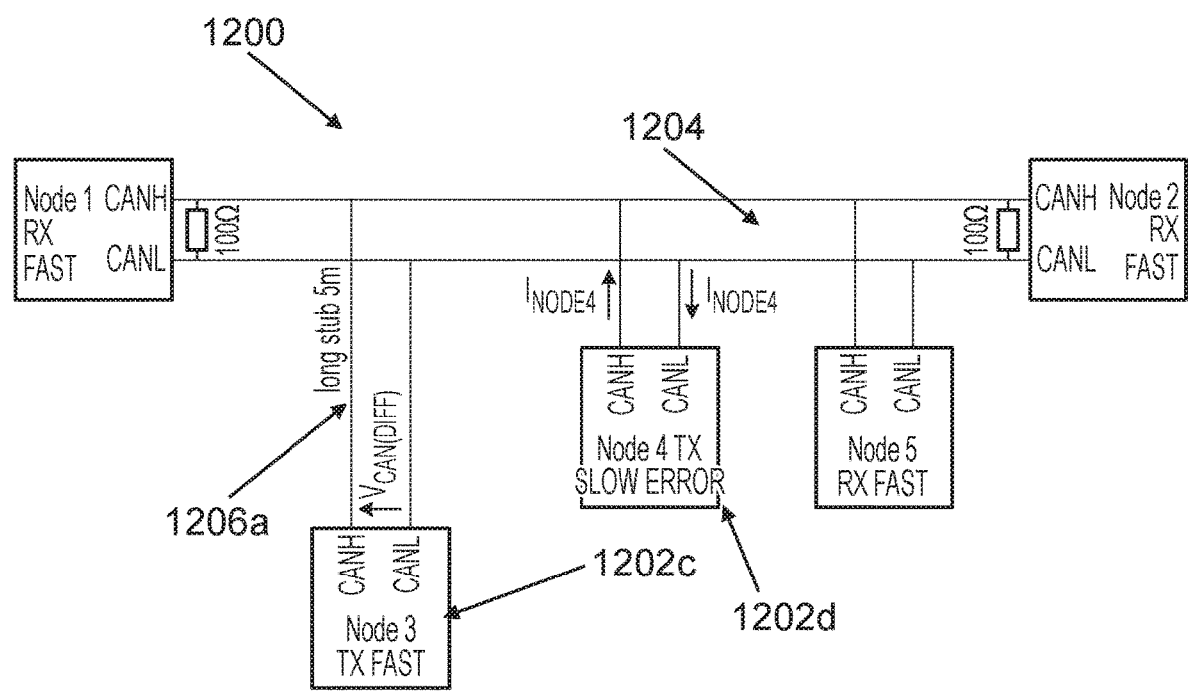
FIG. 12 shows a further example schematic block diagram of a CAN XL bus network.

FIG. 12 illustrates a further example schematic block diagram of a CAN XL bus network 1200. The CAN XL bus network 1200 is similar to the CAN XL bus network 800 described previously with reference to FIG. 8, except that node 3 (1202*c*) is coupled to the CAN bus 1204 via a long stub 1206*a*. As such, the CAN XL bus network 1200 can be taken to correspond to an example case of a bad terminated network resulting in reflections on the bus.

As illustrated in FIG. 12, node 3 (1202*c*) is connected to the network via a long stub 1206*a*, e.g. 5 meters, and this will cause signal disturbance (reflections). In the particular mode of operation of the CAN XL bus network 1200, node 3 (1202*c*) has won arbitration and is transmitting during the data phase in the fast mode (TX FAST). All other nodes are receiving the data (RX FAST) in a first period. At a certain time, node 4 (1202*d*) has detected an error and its CAN XL controller switched back to slow mode and starts transmitting dominant as an error frame (TX SLOW ERROR) in a second period. The timing diagram in FIG. 13 explains in detail what happens in this example.

Figure 13:
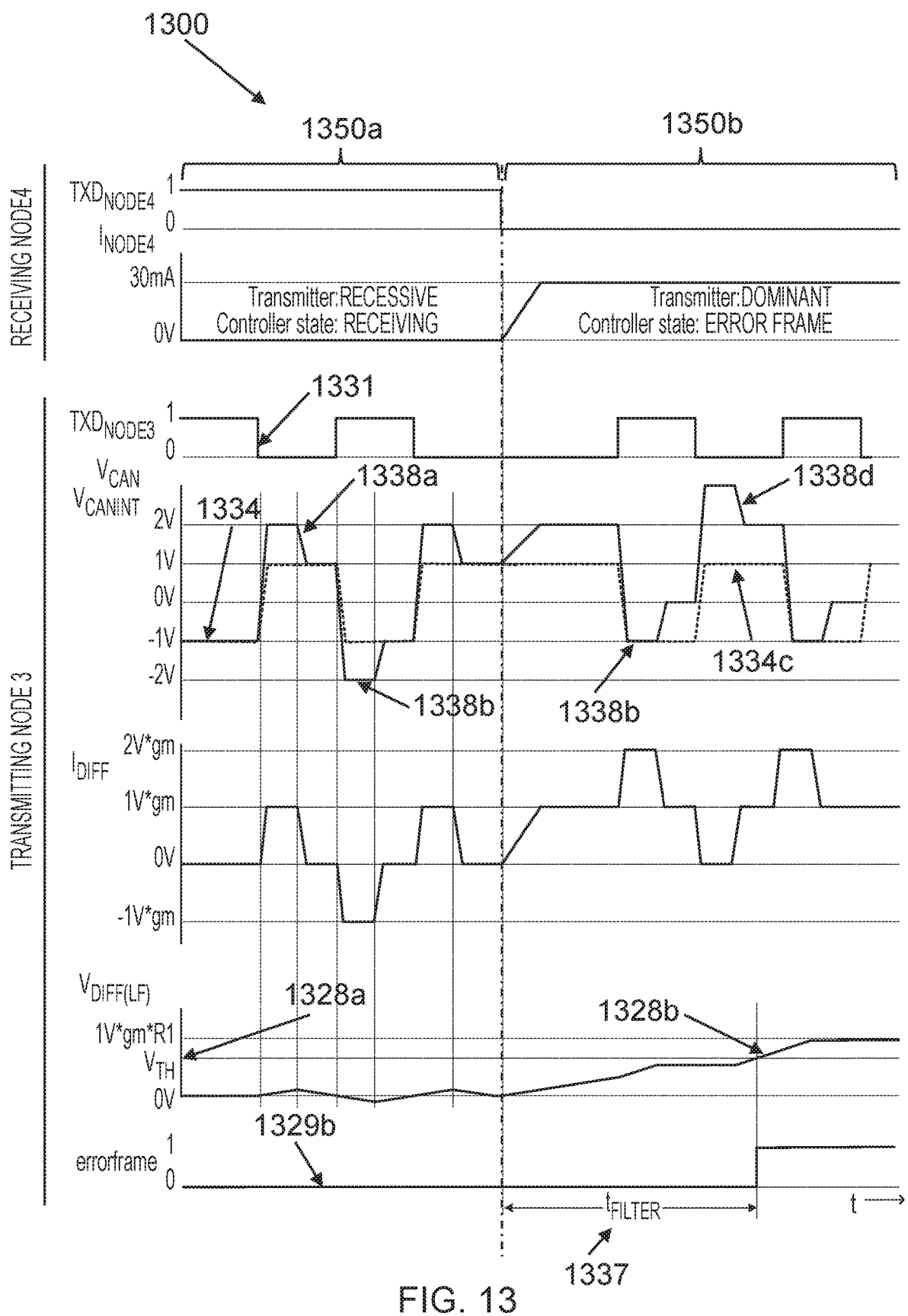
FIG. 13 illustrates a timing diagram corresponding to the CAN XL bus network of FIG. 12.

FIG. 13 illustrates a timing diagram 1300 for the CAN XL bus network 1200 of FIG. 12. The timing diagram 1300 is similar to the timing diagram 1100 described previously with reference to FIG. 11 except that node 3 (1102*c*) is transmitting (TX FAST) instead of node 1 (802*c*) in the CAN XL bus network 800 example of FIG. 8, and that reflections, or overshoots (e.g., overshoots 1338*a-d*), are now present on the CAN differential bus voltage ($V_{CAN}$—solid line) 1334 (but not the internal CAN differential bus voltage ($V_{CANINT}$—dashed line) 1234*c*). The reflections 1338*a-d* are due to the length of the stub 1206*a* and are present in both the first period 1350*a* and the second period 1350*b*.

In the first period 1350*a* of the timing diagram 1300, since node 3 (1202*c*) is transmitting into a long stub (1206*a*) the impedance seen by the transmitter during a transition on the logic level signal on the transmitter input (TXD) 1331 (e.g., from logic level "1" to logic level "0") is not 50 Ohm but the cable impedance only of 100 Ohm. This results in a factor 1.5 higher voltage swing (i.e., from −1V to 2V instead of −1V to 1V) on the CAN differential bus voltage ($V_{CAN}$) 1334 when driving with an output impedance of 100 Ohm. The first (i.e., left-most in FIG. 13) change in the CAN differential bus voltage ($V_{CAN}$) 1334 from −1V to 2V causes an overshoot 1338*a* in the CAN differential bus voltage ($V_{CAN}$) 1334, the overshoot 1338*a* having a duration of 2 times the stub length times the propagation delay in a twisted pair (2*5 m*5 ns=50 ns). The overshoots 1338*a-d* are short compared to the filter time ($t_{filter}$) 1337 and the peak amplitude on the difference voltage $V_{DIFF(LF)}$ 1328*b* will be below the threshold voltage $V_{TH}$ 1328*a*. Also, the overshoots 1338*a-d* are symmetrical due to a symmetrical voltage scheme, and thus do not cause a DC shift. Due to the filtering of capacitor (C1) 727*a* and the resistor (R1) 727*b*, as described previously with reference to FIG. 7, the difference in peak voltage between the CAN differential bus voltage ($V_{CAN}$)) 1334 and the internal CAN differential bus voltage ($V_{CANINT}$) 1334*a* does not result in a false error frame detect in the first period 1350*a*.

Conversely, during the second period 1350*b* of the timing diagram 1300, the voltage shift to the CAN differential bus voltage ($V_{CAN}$)) 1334 caused by node 4 (1202*d*) transmitting 'DOMINANT' as an error frame causes the difference voltage $V_{DIFF(LF)}$ 1328*b* to increase. As described above, the error frame comparator output (errorframe) 1129*b* toggles to logic level "1" when the difference voltage $V_{DIFF(LF)}$ 1328*b* exceeds the threshold voltage $V_{TH}$ 1328*a*, thereby indicating detection of an error frame on the CAN bus 1204.

The present disclosure may be used, for example, with CAN XL to detect a collision on the bus during transmitting in the data-phase. The error frame logic output signal can be used to switch the CAN XL transceiver or controller from fast TX mode to slow mode.

According to another example, the present disclosure may be used with CAN FD, in particular, CAN FD SIC. A CAN FD SIC transceiver has an active recessive phase after the dominant to recessive transition. If during this active recessive phase an error frame is detected, the transceiver can signal dominant to the CAN FD controller by creating a logic low on the RXD output pin.

Figure 14:
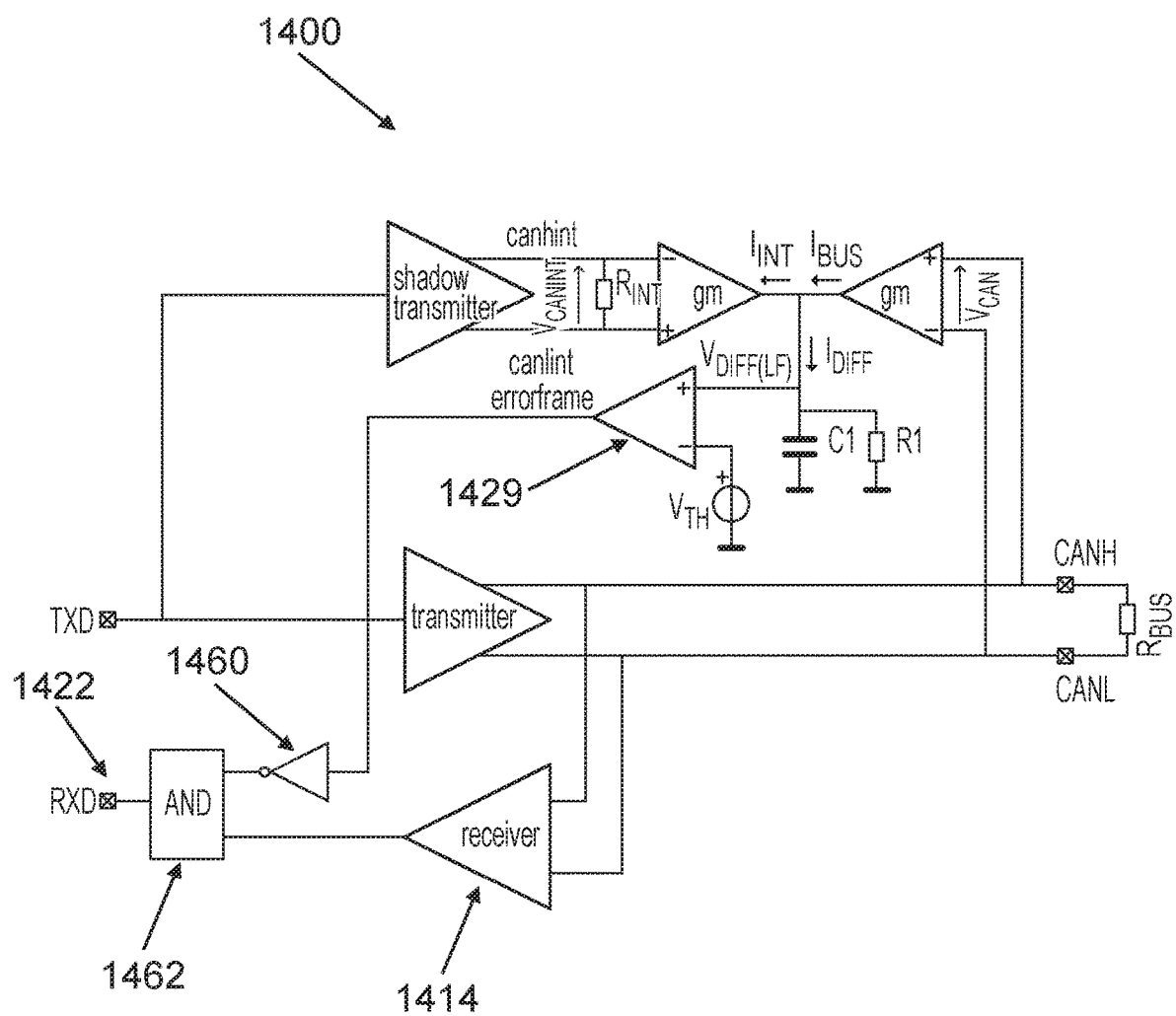
FIG. 14 shows a further example schematic block diagram of a CAN transceiver configured for error frame detection.

FIG. 14 shows a further example schematic block diagram of a CAN transceiver 1400 configured for error frame detection. The CAN transceiver 1400 of FIG. 14 is similar to the CAN transceiver 700 illustrated in FIG. 7 and comprises additional logic between the receiver 1414, error frame comparator 1429 and the receive output 1422.

The additional logic includes an inverter (NOT gate) 1460 and an AND gate 1462. The inverter 1460 has an input coupled to an output of the error frame comparator 1429. An output of the inverter 1460 and an output of the receiver 1414 are provided to inputs of the AND gate 1462. The AND gate is configured to receive data from the receiver 1414 and the output of the inverter 1460 and allow data from the receiver 1414 to reach the receive output 1422 when the output of the error frame comparator 1429 is logic low (such that the output of the inverter 1460 is logic high). In this way, the errorframe signal may be communicated to a CAN controller coupled to the CAN transceiver.

The CAN transceiver 1400 of FIG. 14 enables the use of CAN FD (SIC) with very long stub lengths or with network topologies which have only one node with a termination resistance. Furthermore, the CAN transceiver 1400 of FIG. 14 would allow to strengthen the active recessive level (that is, to drive with a lower impedance during an active recessive level) and allow more series resistance (e.g. with more in line connectors or thinner cabler diameters) in the topology for proper error detection.

Refereeing back to the example of FIG. 7, the shadow transmitter 711*a* does not need to be an exact copy of the transmitter because its output pins are not subjected to the automotive environment and does not need to cope with electromagnetic compatibility/electrostatic discharge (EMC/ESD) and high voltage requirement, as long as the typical differential voltage equals the typical CAN bus voltage. Also, the $R_{INT}$ 725*a* does not need to be the same value as the real CAN bus load; using a higher value will result in less power consumption because the output currents can be lower for the same voltage. The first transconductance amplifier 726 converting the internal CAN differential bus voltage ($V_{CANINT}$) 734*c* to the current representation (INT) 730 of the internal CAN differential bus voltage ($V_{CANINT}$) 734*c* may be simpler compared to the amplifier converting the CAN differential bus voltage ($V_{CAN}$) 734 to the current representation ($I_{Bus}$) 730*a* of the CAN differential bus voltage (V CAN) 734 since it does not need to support a high voltage common mode range of −40V to +40V. The shadow transmitter 711*a* and first transconductance amplifier 726 can also be combined into one circuit which generated directly the current representation (INT) 730 of the internal CAN differential bus voltage ($V_{CANINT}$) 734*c*.

As a further alternative, for example, the subtraction of a shadow internal signal with the CAN bus signal can be done in a digital domain, in which the CAN bus voltage may be converted with an analogue-to-digital converter (ADC) to a digital word and processed by logic or software.

Some examples of the present disclosure propose to create an internal shadow/copy signal to be subtracted with the measured transmitted signal to a CAN transceiver and add a dedicated low pass filter to detect error frames present on the CAN bus. It is proposed to detect an error frame during the data-phase of CAN XL or CAN FD (for example, with CAN FD transceivers, in particular, CAN FD SIC transceivers) traffic by creating a feedforward copy of the transmitter output voltage that will be subtracted with the differential voltage present on the output of the transmitter and then filtered and compared with a threshold.

Although the present examples mainly refer to CAN FD and CAN XL Technology the present disclosure is not limited to those CAN flavors. That is, the underlying concept can also be transferred to further CAN flavours as well as to systems utilizing differential signaling (e.g., systems communicating according to recommended standard (RS) 422 and RS485, Flexray and 10BASET1S).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The skilled person will be able to design many alternative embodiments without departing from the scope of the appended claims.

In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transceiver comprising:
a first transmitter configured to transmit, based on an input signal, a transmitter output voltage signal to a differential signaling bus;
a shadow transmitter configured to generate, from the input signal, a copy of the transmitter output voltage signal to provide an expected differential bus voltage signal;
an error frame detector configured to:
measure a differential bus voltage signal from the differential signaling bus;
determine a difference between the measured differential bus voltage signal and the expected differential bus voltage signal; and
detect an error frame on the differential signaling bus in response to determining that the difference between the measured differential bus voltage signal and the expected differential bus voltage signal exceeds a threshold for a predetermined period;
a first transconductance amplifier configured to convert the expected differential bus voltage signal to a first current signal; and
a second transconductance amplifier configured to convert the measured differential bus voltage signal from the differential signaling bus to a second current signal;
wherein the error frame detector is further configured to determine the difference between the expected differential bus voltage signal and the measured differential bus voltage signal by determining a difference between the first current signal and the second current signal.

2. The transceiver of claim 1, further comprising:
a low pass filter configured to convert the difference between the first current signal and the second current signal into a voltage difference for comparison with the threshold.

3. The transceiver of claim 2, further comprising: a comparator configured to compare the voltage difference with the threshold.

4. The transceiver of claim 3, wherein the error frame detector is further configured to provide an indication of the detecting the error frame to a transceiver controller in accordance with an output of the comparator.

5. The transceiver of claim 1, wherein the expected differential bus voltage signal is not an exact copy of the transmitter output voltage signal.

6. The transceiver of claim 1, wherein the transceiver is a Controller Area Network (CAN) transceiver and the differential signaling bus is a CAN bus.

7. The transceiver of claim 6, wherein the error frame detector is further configured to detect a collision during a data phase of a CAN operation, in which the data phase contains symbols defined by a negative differential voltage level on the differential signaling bus.

8. A CAN node comprising:
the CAN transceiver of claim 7; and
a CAN controller, in which the CAN controller is configured to provide the input signal to the CAN transceiver and switch to an arbitration mode of operation in response to the detection of the collision on the CAN bus.

9. The CAN node of claim 8, in which the CAN controller is further configured to operate in the arbitration mode in accordance with ISO 11898-1:2003.

10. A method for operating a transceiver, comprising:
receiving an input signal from a transceiver controller;
transmitting, based on the input signal, a transmitter output voltage signal to a differential signaling bus using a transmitter of the transceiver;
generating, from the input signal, a copy of the transmitter output voltage signal to provide an expected differential bus voltage signal;
measuring a differential bus voltage signal from the differential signaling bus;
determining a difference between the measured differential bus voltage signal and the expected differential bus voltage signal;
applying a low pass filter configured to convert the difference between the expected differential bus voltage signal and the measured differential bus voltage signal into a filtered voltage difference for comparison with a threshold; and
detecting an error frame on the differential signaling bus after the determined difference in response to determining that the filtered voltage difference exceeds the threshold for a predetermined period.

11. A non-transitory medium storing executable instructions configured, when executed by a processor, to cause the processor to perform a method for operating a transceiver comprising:
receiving an input signal from a transceiver controller;
transmitting, based on the input signal, a transmitter output voltage signal to a differential signaling bus;
generating, from the input signal, a copy of the transmitter output voltage signal to provide an expected differential bus voltage signal;
measuring a differential bus voltage signal from the differential signaling bus;
determining a difference between the measured differential bus voltage signal and the expected differential bus voltage signal;
applying a low-pass filter to the difference between the expected differential bus voltage signal and the measured differential bus voltage signal into a filtered voltage difference for comparison with a threshold; and detecting an error frame on the differential signaling bus in response to determining that the filtered voltage difference exceeds the threshold for a predetermined period.

12. The method of claim 10, wherein determining the difference between the measured differential bus voltage signal and the expected differential bus voltage signal includes:

converting the measured differential bus voltage signal to a first current signal;

converting the expected differential bus voltage signal to a second current signal; and determining a difference between the first current signal and the second current signal.

13. The non-transitory medium of claim 11, wherein the instructions are further configured, when executed by the processor, to cause the processor to determine the difference between the measured differential bus voltage signal and the expected differential bus voltage signal by:

converting the measured differential bus voltage signal to a first current signal;

converting the expected differential bus voltage signal to a second current signal; and determining a difference between the first current signal and the second current signal.

14. A transceiver comprising:

a first transmitter configured to transmit, based on an input signal, a transmitter output voltage signal to a differential signaling bus;

a shadow transmitter configured to generate, from the input signal, a copy of the transmitter output voltage signal to provide an expected differential bus voltage signal;

an error frame detector configured to:

measure a differential bus voltage signal from the differential signaling bus;

determine a difference between the measured differential bus voltage signal and the expected differential bus voltage signal; and detect an error frame on the differential signaling bus after the determined difference exceeds a threshold for a predetermined period; and applying a low pass filter configured to convert the difference between the expected differential bus voltage signal and the measured differential bus voltage signal into a filtered voltage difference for comparison with the threshold;

wherein the error frame detector is further configured to detect the error frame in response to determining that the filtered voltage difference exceeds the threshold for the predetermined period.

* * * * *